United States Patent Office 3,533,765
Patented Oct. 13, 1970

3,533,765
METHOD OF OPERATING AN ENGINE AND FUEL
Robert V. Kerley, Birmingham, and Arthur E. Felt, Farmington, Mich., assignors to Ethyl Corporation, New York, N.Y., a corporation of Virginia
No Drawing. Filed May 8, 1967, Ser. No. 636,646
Int. Cl. C10k 3/00
U.S. Cl. 48—197
8 Claims

ABSTRACT OF THE DISCLOSURE

A method of operating a normally gaseous fuel powered, spark ignition internal combustion engine characterized by the introduction of a power improving amount of a cyclopentadienyl manganese carbonyl compound into the combustion chamber. Natural gas is an especially useful fuel; (methylcyclopentadienyl) mangenese tricarbonyl is a preferred manganese compound. The power output of the internal combustion engine operated according to the improved method, is shown to be substantially increased. The gaseous fuel containing the cyclopentadienyl manganese compound is also described.

BACKGROUND OF THE INVENTION

Stationary, spark ignited internal combustion engines are used as power sources for generating electrical energy and for many other uses. Because of the large power requirements placed on these engines, normally gaseous fuels such as propane, methane, and especially natural gas, are commonly used as the fuel. An important requirement of this type of engine is that it must be able to maintain a constant, high power output. Two factors contribute to placing an extra burden on the engine in maintaining this constant high power output. They are (1) the variability in the gaseous fuel composition, especially where natural gas is used and (2) rapid fluctuation in power requirements.

It is impracticable to control the composition of the gaseous fuel especially when it is a natural occurring product such as natural gas. Increased power requirements at peak usage, as for example, where there is a substantial surge in electricity used during peak periods, can be provided for by using larger, more expensive engines. This is costly and again impractical.

It has been discovered that the power output of a gaseous fuel powered engine can be effectively increased to meet the requirements of (1) the fluctuation of the hydrocarbon composition of the fuel gas and (2) the peak power requirements described above, by introducing a small, but effective amount of a cyclopentadienyl manganese carbonyl compound, as required, into the combustion chamber.

SUMMARY OF THE INVENTION

An improved method of operating spark ignited internal combustion engine characterized by having an improved power output which comprises introducing a small amount of a cyclopentadienyl manganese carbonyl type compound into the combustion chamber. The manganese compound may be introduced directly into the combustion chamber (cylinder) or indirectly by introducing the manganese compound into the fuel or air stream prior to entry into the combustion chamber.

Another object of the inventiton is the gaseous fuel containing the power improving quantity of said manganese compound.

PREFERRED EMBODIMENTS

An embodiment of this invention is a method of operating a normally gaseous-fueled, spark-ignition internal combustion engine by introducing into the combustion chamber a power improving amount of a cyclopentadienyl manganese compound having the formula $$RMn((CO)_3 \qquad (I)$$

wherein R is a hydrocarbyl cyclopentadienyl radical having from 5 to about 10 carbon atoms. Another embodiment of this inventiton is the method described above wherein said normally gaseous fuel is selected from natural gas, methane, ethane, propane and mixtures thereof. Still another embodiment of this invention is the method of operating an engine as described above wherein said manganese compound is present in an amount of from about 0.05 to about 1.5 grams of manganese per therm. A therm is a quantity of a gas wihch has a heating value of 100,000 B.t.u. A preferred embodiment is the method described above wherein said cyclopentadienyl manganese compound is methylcyclopentadienyl manganese tricarbonyl. A most preferred method is the method described above wherein said fuel is natural gas, and said cyclopentadienyl compound is methyl cyclopentadienyl manganese tricarbonyl.

Still another embodiment of this invention is a normally gaseous fuel containing from about 0.05 to about 1.5 grams of manganese per therm as the manganese compound having Formula I. A preferred gaseous fuel is natural gas containing from 0.05 to about 1.5 grams of manganese per therm, as (methylcyclopentadienyl) manganese tricarbonyl.

Fuels which are used in the improved method of the present invention are the hydrocarbon containing fuels which are normally gaseous at normal temperature (60° F.) and pressure (1 atmo.). This type of fuel is generally composed of saturated hydrocarbons having up to about two carbon atoms. These hydrocarbons are not easily liquefied. Typically useful hydrocarbons are methane, ethane, and mixtures thereof. Natural gas, a naturally occurring mixture containing a major portion of methane, is an especially preferred fuel.

The amount of methane in natural gas varies from 60–95 percent. Typical natural gas contains approximately 85 percent methane. Ethane is generally present in amounts up to about 10 percent; propane, in amounts up to about 3 percent. Butane, pentane, hexane, and the like are also likely to be present. In addition, impurities such as carbon dioxide, nitrogen, helium and hydrogen sulfide are also present.

By natural gas, we include not only the naturally occurring mixtures of gaseous hydrocarbons, but also "manufactured natural gas." This "manufactured natural gas" includes gas resulting from cracking operations in the petroleum industry, water, gas, etc., gas made from natural products such as lignite and the like. This manufactured natural gas is characterized by containing a substantial portion of methane.

The organometallic compounds which are useful in this invention are manganese complexes illustrated by Formula I above, wherein R is a cyclopentadienyl radical having 5 or more carbon atoms. The cyclopentadienyl radical is bound directly to the manganese atom. These compounds and methods for their preparation are fully described in U.S. 2,818,417 issued Dec. 31, 1957, to Brown et al.; the contents of that disclosure are incorporated herein by reference. Preferred cyclopentadinyl manganese tricarbonyls are those wherein the cyclopentadienyl moiety has from 5 to about 13 carbon atoms. Examples of these compounds are cyclopentadienyl mangenese tricarbonyl, indenyl manganese tricarbonyl, (2-ethylhexylcyclopentadienyl)manganese tricarbonyl, (n-pentylcyclopentadienyl)manganese tricarbonyl, (1 - tertbutyl-4 - methylcyclopentadienyl)manganese tricarbonyl and its positional isomers, fluorenylmangenese tricarbonyl, and the like, a most preferred (cyclopentadienyl) manganese tricarbonyl.

The method of operating the spark-ignition internal combustion engine of the present invention is carried out by introducing a small but effective amount of a manganese compound having Formula I into the combustion chamber (cylinder chamber). An especially practical means of getting the manganese compound into the cylinder is to add it into the fuel stream prior to its introduction into the cylinder. The stationary internal combustion engine with which the present invention is concerned, operates on the same basic principle as the four-cycle gasoline-fueled internal combustion engine. In the present engines, rather than using a carburetor/manifold system to feed the air-fuel mixture into the cylinder, the gas and air are fed separately but directly into the combustion chamber. There is normally no premixture of the air-gas fuel mixture prior to its meeting in the cylinder. Thus, the cyclopentadienyl manganese compound can be conveniently introduced into the fuel line either as a finely dispersed liquid or as a vapor. In the latter case, the cyclopentadienyl manganese compound is heated to a temperature at which a substantial amount of manganese compound is vaporized.

In the former method, the manganese compound is introduced, as a finely divided liquid, into the gas stream at a point just prior to the fuel entry into the cylinder. Where the manganese compound is not a liquid at ordinary temperature, the compound may be fluidized by either heating it or dissolving it in a small portion of a suitable solvent.

In order to insure proper dispersion and particle size of the manganese compound in the fuel, the fuel containing the manganese compound may be passed through a heat exchanger, for example, a heating cycle just before it enters the cylinder; the fuel containing the manganese compound may also be physically mixed by means of a turbulence and comminution device inserted into the fuel line between the manganese compound entry injection point and the cylinder fuel entry port. A combination of these two means, that is, the physical mixing device and the heat exchanger is also useful.

Of the two methods of introducing the manganese compound into the combustion cylinder, the procedure wherein the manganese compound is added into the fuel stream is preferred. This is primarily because of the greater ease of (1) controlling the concentration of the manganese compound and (2) insuring a homogeneous mixture of manganese compound and fuel in the cylinder. However, introducing the manganese compound into the cylinder directly is also effective in carrying out the improved operating method of the present invention.

The amount of manganese compound which is introduced into the cylinder may be varied over a wide range. The concentration will be controlled dependent on the composition of the gaseous fuel, the air fuel mixture ratio, the power requirements of the engine, in order to insure the most efficient operation of the engine. Generally, the amount of cyclopentadienyl manganese carbonyl compound will be about 0.05 to about 1.5 grams of manganese per therm. A therm is an amount of gas which has a heating value of 100,000 B.t.u. A suitable concentration expressed as grams of manganese as a manganese compound having Formula I is from 0.05 to about 1.0. A preferred concentration is 0.05 to about 0.8 gram of manganese (as Formula I compound) per therm. Greater and lesser amounts then the range disclosed above may be used.

As pointed out above, the improved engine operating method substantially increases the power output of the engine. This increased power output was determined in an actual engine test. The engine used was a single-cylinder supercharged engine. A description of the engine and test conditions follows:

Engine—Waukesha RDH-VCR (removable dome head-variable compression ratio)
Compression ratio—Fixed at 10:1
Bore and stroke—$3{13/16}''$ x $3{5/8}''$
Engine speed—1800 r.p.m.
Intake air temperature—150° F.
Ignition timing—Variable with $F/A$ (fuel/air) ratio—MBT (minimum for best torque)

The power ratings were determined in the following manner. The engine was run using natural gas as the fuel, increasing the load until the engine began to knock. At this point, the power output of the engine was determined. This is referred to as Knock Limited Power and is the maximum power output of the engine on a fuel. Next a small amount of a manganese compound having Formula I was introduced into the fuel feed and the procedure was repeated, that is, the engine was run with increasing load under the conditions described above until it was again knock limited. The difference between the Knock Limited Power of the natural-gas fueled run and the natural gas plus manganese compound run was then determined. The improvement was reported as percent increase in Knock Limited Power (KLP). Following is the data obtained using this procedure for natural gas containing various amounts of (methylcyclopentadienyl)manganese tricarbonyl.

TABLE 1.—ENGINE POWER INCREASE

| Base fuel | Gms. of Mn [2] per therm | Fuel/air ratio | KLP [3] increase, percent |
|---|---|---|---|
| Natural gas [1] | 0.29 | 0.05 | 21.5 |
| ----Do. [1] | 0.416 | 0.06 | 24.5 |
| ----Do. [1] | 0.415 | 0.07 | 28.5 |
| Average | | | 24.8 |

[1] Natural gas analysis—84% methane; 3% ethane; 18% propane; 7% nitrogen; 2% total other constituents.
[2] As (methylcyclopentadienyl) manganese tricarbonyl.
[3] Knock Limited Power.

The data in Table 1 clearly indicates the substantial improvement in power output of an engine using natural gas containing methylcyclopentadienyl manganese tricarbonyl in the fuel. In each case the improvement in power over plain natural gas is substantial. In more practical terms, based on the average KLP increase, this would mean that an engine rated at 4,000 horsepower on natural gas would produce about 5,000 horsepower using natural gas containing a minute portion of methylcyclopentadienyl manganese tricarbonyl.

Normally gaseous fuel compositions of the present invention include the gaseous fuels disclosed herein containing from 0.05 to about 1.5 grams of manganese per therm as a manganese compound having Formula I. Following is a table of useful fuel compositions:

TABLE 2

| Fuel No. | Base fuel | RMn(CO)₃ compound | Grams Mn per therm as RMn(CO)₃ |
|---|---|---|---|
| 1 | Methane | Cyclopentadienylmanganese tricarbonyl. | 1.0 |
| 2 | 90% methane 10% ethane | (n-Pentylcyclopentadienyl) manganese tricarbonyl. | 0.45 |
| 3 | 60% methane 30% ethane 10% nitrogen | (tert-Butylcyclopentadienyl) manganese tricarbonyl. | 1.5 |
| 4 | Natural gas | (Methylcyclopentadienyl) manganese tricarbonyl. | 0.6 |
| 5 | ----do---- | (Ethylcyclopentadienyl) manganese tricarbonyl. | 0.3 |
| 6 | ----do---- | Indenylmanganese tricarbonyl | 0.005 |

Having fully described the method and fuel composition of the present invention, the scope of the invention is limited only to the lawful extent of the claims which follow.

What is claimed is:

1. A method of operating a normally gaseous fueled, spark ignition, internal combustion engine which comprises introducing into the combustion chamber a power-improving amount of a cyclopentadienyl manganese compound having the formula $RMn(CO)_3$ wherein R is a hydrocarbyl cyclopentadienyl radical having from 5 to about 10 carbon atoms.

2. The method of claim 1 wherein said normally gaseous fuel is selected from natural gas, methane, ethane, and mixtures thereof.

3. The method of claim 1 wherein said power-improving amount is from about 0.05 to about 1.5 grams of manganese per therm, as said cyclopentadienyl manganese compound.

4. The method of claim 3 wherein said cyclopentadienyl compound is (methylclopentadienyl) manganese tricarbonyl.

5. The method of claim 4 wherein said gaseous fuel is natural gas.

6. A normally gaseous hydrocarbon fuel containing from about 0.05 to about 1.5 grams of manganese per therm, as said cyclopentadienyl manganese compound of claim 1.

7. The fuel of claim 6 wherein said gaseous hydrocarbon fuel is natural gas.

8. The fuel of claim 7 wherein said cyclopentadienyl compound is (methylcyclopentadienyl) manganese tricarbonyl.

References Cited

UNITED STATES PATENTS

| | | |
|---|---|---|
| 2,867,516 | 1/1959 | Pederson. |
| 2,987,528 | 6/1961 | Brown et al. _____44—68 XR |
| 3,261,674 | 7/1966 | Condo _____ 44—68 XR |
| 3,353,938 | 11/1967 | Niedzielski _____ 44—68 XR |

MORRIS O. WOLK, Primary Examiner

R. E. SERWIN, Assistant Examiner

U.S. Cl. X.R.

252—372, 386